United States Patent
Mosley et al.

(10) Patent No.: US 7,984,865 B2
(45) Date of Patent: Jul. 26, 2011

(54) APPARATUS AND METHOD OF PROCESSING RAW MATERIALS

(75) Inventors: Ken Mosley, Trussville, AL (US); Kenneth T. Nickerson, Hueytown, AL (US); Rick Renninger, Hoover, AL (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 12/889,251

(22) Filed: Sep. 23, 2010

(65) Prior Publication Data

US 2011/0011963 A1    Jan. 20, 2011

Related U.S. Application Data

(62) Division of application No. 11/517,759, filed on Sep. 8, 2006, now Pat. No. 7,823,811.

(60) Provisional application No. 60/715,408, filed on Sep. 9, 2005.

(51) Int. Cl.
*B02C 23/08* (2006.01)

(52) U.S. Cl. .......... 241/79.1; 241/97; 241/101.8

(58) Field of Classification Search ............ 241/21, 241/22, 25, 19, 23, 24.11, 101.8, 79.1, 80, 241/97
See application file for complete search history.

(56) References Cited

U.S. PATENT DOCUMENTS

| | | | | |
|---|---|---|---|---|
| 2,622,027 A | * | 12/1952 | Torr | 426/518 |
| 3,437,489 A | * | 4/1969 | Arakawa et al. | 426/541 |
| 3,598,606 A | * | 8/1971 | Spinellii | 530/420 |
| 5,713,788 A | * | 2/1998 | Ferket et al. | 452/138 |
| 5,759,568 A | * | 6/1998 | Mosley, Sr. | 424/442 |
| 5,935,623 A | * | 8/1999 | Alonso-Debolt | 426/2 |
| 6,136,590 A | * | 10/2000 | Kruse | 435/262 |
| 6,635,297 B2 | * | 10/2003 | Moss et al. | 426/531 |
| 6,899,294 B2 | * | 5/2005 | MacNeil | 241/24.12 |
| 2003/0209617 A1 | * | 11/2003 | MacNeil | 241/24.12 |
| 2007/0134376 A1 | * | 6/2007 | Connell | 426/56 |

* cited by examiner

*Primary Examiner* — Bena Miller
(74) *Attorney, Agent, or Firm* — Haverstock & Owens LLP

(57) ABSTRACT

A method and apparatus for processing animal byproduct materials is disclosed. In some embodiments, the apparatus includes a grinder for grinding the byproduct materials; a mixer for mixing the ground byproduct materials with an oil absorbing material and a backmix material; and a dryer for drying the mixed materials. In some embodiments, the apparatus also includes a cyclone for separating an air stream from the dried materials. The dried materials are transported to one or more presses for pressing the dried materials, thereby reducing oil content. The one or more presses includes a first opening for delivering pressed oil to a centrifuge and a second opening for sending the pressed materials to a screener. A portion of the screened material is sent back to the mixer (and/or the grinder) and the balance of the screened material are sent to storage as a finished product.

16 Claims, 3 Drawing Sheets

APPARATUS AND METHOD OF PROCESSING RAW MATERIALS

CROSS REFERENCE TO RELATED APPLICATIONS

The present application is a divisional of co-pending U.S. patent application Ser. No. 11/517,759, filed on Sep. 8, 2006, and entitled "AN APPARATUS AND METHOD OF PROCESSING RAW MATERIALS" which is based on and claims priority to U.S. Provisional Patent Application Ser. No. 60/715,408, filed Sep. 9, 2005, entitled "Apparatus and method of processing raw materials," by the same inventors. This application incorporates both U.S. patent application Ser. No. 11/517,759, filed on Sep. 8, 2006, and entitled "AN APPARATUS AND METHOD OF PROCESSING RAW MATERIALS" and U.S. Provisional Patent Application Ser. No. 60/715,408, filed Sep. 9, 2005, and entitled "Apparatus and method of processing raw materials" in their entirety by reference.

FIELD OF THE INVENTION

This invention relates to rendering processes. More specifically, this invention relates to an improved method and apparatus for processing animal byproduct materials having an original moisture content of about 50 to 80 percent, that grinds and mixes the materials with an oil absorbing material and a backmix material and then dries the mixed materials, resulting in a final product containing about 2 to about 25 percent moisture.

BACKGROUND OF THE INVENTION

Rendering is an industrial process that converts raw materials into stable, value-added materials. The process involves heating or cooking of raw materials to liquefy and separate fat from animal tissues. The majority of tissue processed comes from slaughterhouses but also includes restaurant grease and butcher shop trimmings. This material can include the fatty tissue, bones, and offal, as well as entire carcasses of animals condemned at slaughterhouses, and those that have died on farms or in transit. The most common animal sources are beef, pork, sheep, poultry and fish.

Generally, the rendering process is accomplished by receiving raw materials, such as animal byproduct materials, followed by removing undesirable parts, cutting, mixing, cooking and separating fat and protein materials. The concentrated protein is then dried and ground. The rendering process yields a fat commodity and a protein meal. Additionally, refining of gases, odors, and wastewater is necessary. After rendering, the materials are much more resistant to spoiling. The fat can be used in animal feed, as a raw material for biodiesel production, and as a feed-stock for the chemical industry. The bone and protein becomes dry particles known as meat and bone meal, and can be fed to certain animals.

FIG. 1 discloses a conventional apparatus 100 utilized in an animal byproduct rendering process. Raw material to be rendered is received for temporary storage in raw material bins 120. The raw material is then conveyed to a raw material grinder 125 that reduces the raw material to a uniform particle size for material handling and improved heat transfer for cooking. The ground raw material is fed into a cooker 130. The cooker 130 is heated by a boiler 135 generating boiler steam. The boiler brings the raw material to a predetermined and elevated temperature, evaporating moisture and freeing fat from protein and bone. A dehydrated slurry of fat and solids is discharged from the cooker 130 at a controlled rate. The discharged slurry is transported to an oil drainer 160. The drainer 160 separates liquid fat from the solids. The liquid fat is pumped to an oil centrifuge 165, which removes impurities from the fat. The fat is transported to the storage 168 as finished fat. The solids from the drainer 160 go to the presses 170, which reduce the solids' fat content further. Solids discharged from the presses go to a grinding room 175, a hammermill 180, and a screener 185 for further screening and processing of the solids, where they are transported to the storage 190 as a finished product.

Still referring to FIG. 1, water vapor exits the cooker 130 to a condenser 150, which condenses the water vapor. The condensed vapors are eventually discharged as waste water. Odorous gases generated at various points in the rendering process are collected for neutralization and removal by a scrubber 140.

The conventional rendering process of FIG. 1 has several disadvantages. Cookers generate strong odors and the cookers use in the rendering process requires expensive odor control equipment, such as scrubbers, condensers and waste water storage. These odor-control and odor-causing sources require increased personnel labor, water use, energy consumption, and adequate cooling capacity, in addition to their costs.

U.S. Pat. No. 5,759,568 describes a method of processing a waste water stream into animal foodstuffs. The '568 patent is based on addition of bentonite and a polymer to a food processing plant's waste water stream. The '568 patent describes the process as a combination of, at least, three aqueous streams, so that the final stream can be substantially diluted. This is confirmed by the use of a flotation vessel for solids-water separation, resulting in the discharge of the effluent into the sewer system. A drawback of the invention is that the flotation process results in separated solids containing abundant moisture, and the effluent containing residual suspended solids. The bentonite material has to be hydrated prior to mixing with the waste water stream. The '568 patent is thus limited to diluted waste water streams. The '568 patent also uses filter presses for sludge dewatering that significantly adds to the cost of the process.

SUMMARY OF THE INVENTION

An apparatus and method of processing animal byproduct materials is disclosed. In one embodiment, the apparatus comprises a grinder for grinding the byproduct materials; a mixer for mixing the ground byproduct materials with an oil absorbing material and a backmix material; and a dryer for drying the mixed materials. In some embodiments, the apparatus includes a cyclone for separating an air stream from the dried materials. Alternatively, a bag house is used for separating an air stream from the dried materials. In some embodiments, the air stream is drawn into a scrubber while the dried materials are transported to one or more presses. The presses press the dried materials, reducing oil content from the dried materials. In some embodiments, the presses include a first opening for delivering pressed oil to a centrifuge and a second opening for transporting the pressed materials to a screener through a hammermill. From the screener, a portion of the screened material is sent back to the mixer and/or the grinder. The balance of the screened material is sent to storage as finished product. In some embodiments, the backmix materials are dried backmix materials.

The byproduct materials can have an original moisture content of about 50 to about 80 percent. In one embodiment, the byproduct materials have an original moisture content of about 70 percent. The ground and mixed materials contain less than 70 percent and greater than about 30 percent moisture prior to drying. In one embodiment, the ground and mixed materials contain about 50 percent moisture prior to drying. The dried materials contain about 2 to about 25 percent moisture. In one embodiment, the dried materials contain about 10 percent moisture.

In another embodiment of the present invention, a method of processing animal byproduct materials is disclosed. The method comprises grinding the byproduct materials; mixing the ground byproduct materials with an oil absorbing material and a backmix material; and drying the mixed materials. In some embodiments, the method also includes separating an air stream from the dried materials. In some embodiments, the method further includes transporting the dried materials to one or more presses for pressing the dried materials, thereby reducing oil content from the dried materials, and drawing the air stream to a scrubber. In some embodiments, the method further includes delivering pressed oil to a centrifuge through a first opening of the presses and transporting the pressed materials to a screener via a hammermill through a second opening of the one or more presses. In some embodiments, the method further includes sending a portion of the screened materials back to the mixer (and/or the grinder) and storing the balance of the screened material as a finished product. In some embodiments, the backmix material is a dried backmix material.

The byproduct materials can have an original moisture content of about 50 to about 80 percent. In one embodiment, the byproduct materials have an original moisture content of about 70 percent. The ground and mixed materials resulting from mixing the ground byproduct materials contains less than 70 percent and greater than about 30 percent moisture prior to drying the mixed materials. In one embodiment, the ground and mixed materials contain about 50 percent moisture prior to drying. The dried materials resulting from drying the mixed materials contain about 2 to about 25 percent moisture.

In another embodiment of the present invention, an apparatus for processing animal byproduct materials is disclosed. The apparatus comprises a grinder for grinding the byproduct materials; a mixer for mixing the ground byproduct materials with an oil absorbing material and a backmix material; a dryer for drying the mixed materials; and a cyclone (or bag house) for separating an air stream from the dried materials.

In another embodiment of the present invention, a method of processing animal byproduct materials is disclosed. The method comprises grinding the byproduct materials; mixing the ground byproduct materials with an oil absorbing material and a backmix material; drying the mixed materials; and separating an air stream from the mixed materials.

In another embodiment of the present invention, an apparatus for processing animal byproduct materials containing about 50 to about 80 percent moisture is disclosed. The apparatus comprises a grinder for grinding the byproduct materials and a mixer for mixing the ground byproduct materials with an oil absorbing material and a dried backmix material. The ground and mixed materials contains less than 70 percent and greater than about 30 percent moisture. The apparatus also comprises a dryer for drying the mixed materials. The dried materials contain about 2 to about 25 percent moisture.

In another embodiment of the present invention, a method of processing animal byproduct materials containing about 50 to about 80 percent moisture is disclosed. The method comprises grinding the byproduct materials and mixing the ground byproduct materials with an oil absorbing material and a dried backmix material, resulting in a moisture content of less than 70 percent and greater than about 30 percent. The method also comprises drying the mixed materials, resulting in a moisture content of about 2 to about 25 percent.

DETAILED DESCRIPTION OF THE PREFERRED EMBODIMENTS

Figure 1:
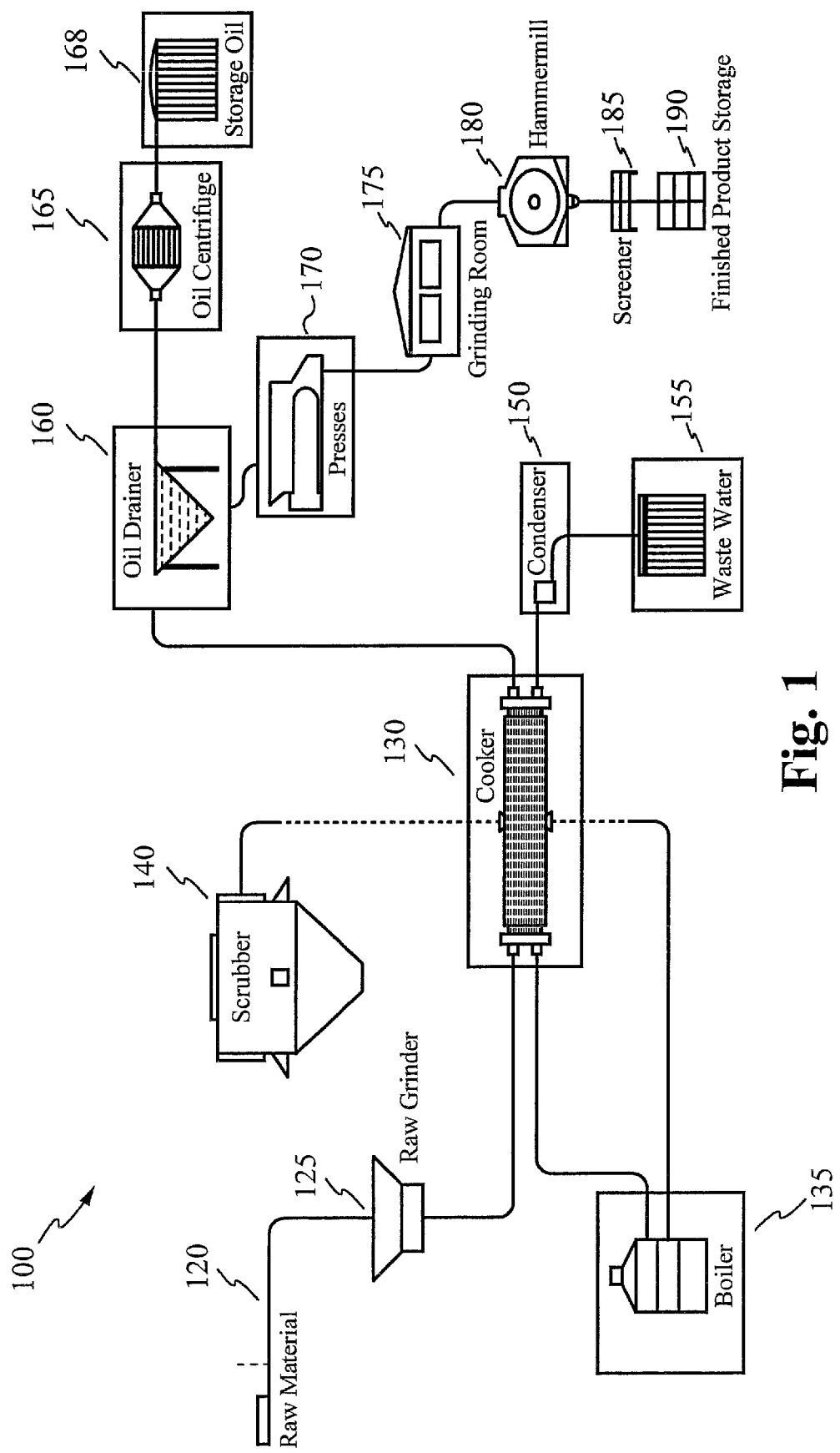
FIG. 1 shows a conventional apparatus utilized in animal byproduct rendering processes.
Figure 2:
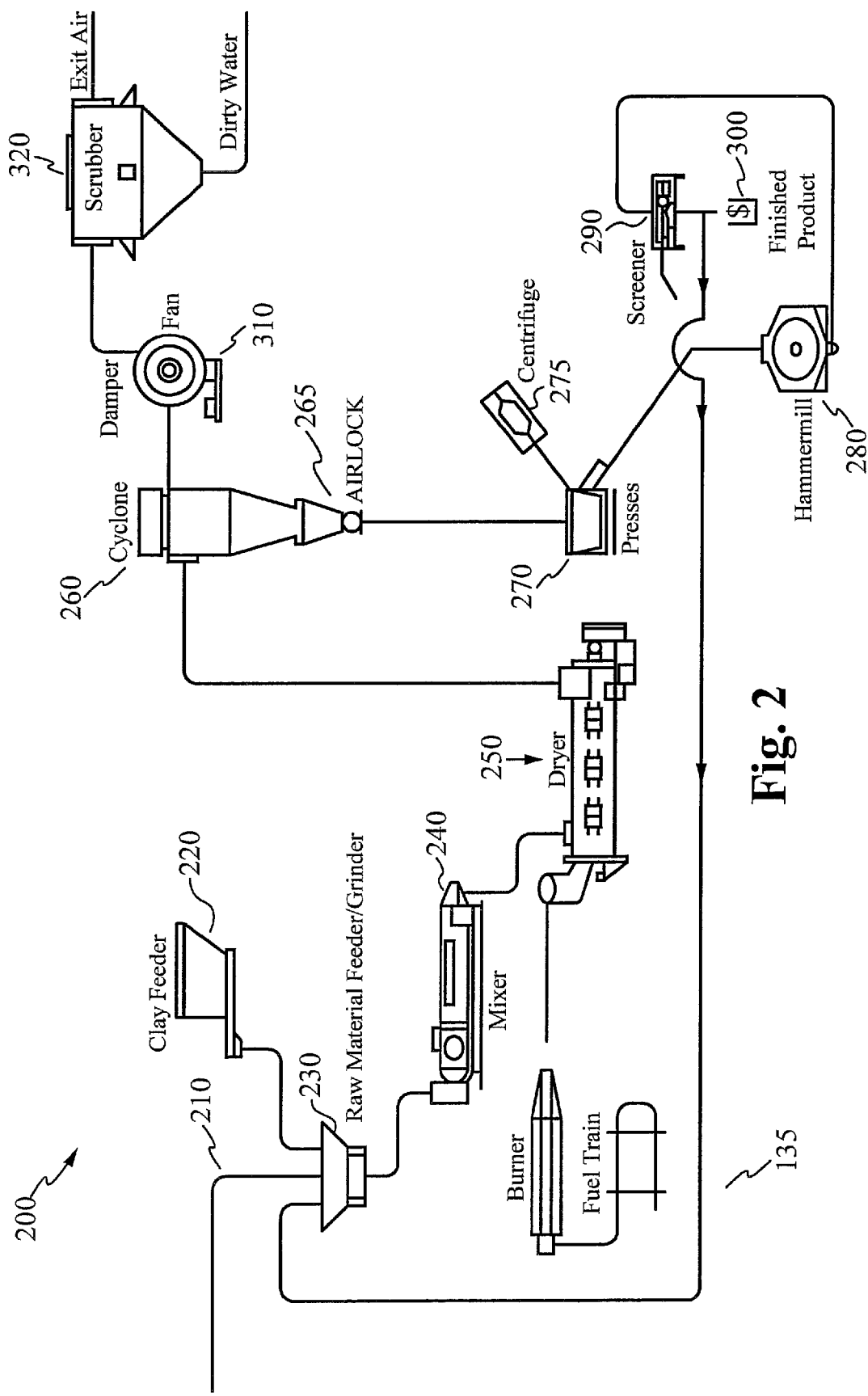
FIG. 2 shows an apparatus utilized in an animal byproduct rendering process, according to one embodiment of the present invention.

The present invention is directed to an improved method and apparatus for processing animal byproduct materials. FIG. 2 shows an apparatus 200 according to one embodiment of the present invention. The apparatus 200 includes a raw material grinder 230 for grinding raw material 210. The raw material 210 is preferably an animal byproduct material having an original moisture content of about 50 to about 80 percent, a fat content of approximately 10 to about 50 percent, and a protein content of about 10 to about 50 percent. In one embodiment, the original moisture content of the raw material is approximately 70 percent. In some embodiments, an oil absorbing material, such as a bentonite clay material, from a clay feeder 220 is mixed with the raw material 210 in the grinder or in a mixer 240. The oil absorbing material is preferably a carrier to help carry the oil. The mixer 240 mixes the ground raw material with the oil absorbing material and a backmix material. In some embodiments, the backmix material is any dried animal byproduct material, such as offal. The ground and mixed materials contain less than 60 percent and greater than about 40 percent moisture prior to drying. In one embodiment, the ground and mixed materials contain approximately 50 percent moisture prior to drying. The mixed materials are then conveyed to a dryer 250 for drying the mixed materials. The dried materials contain about 2 to about 25 percent moisture. In one embodiment, the dried materials contain approximately 10 percent moisture. The dried materials are then sent to a cyclone 260 for separating an air stream from the dried materials. In one embodiment, the cyclone 260 is replaced by a bag house (not shown) for separating an air stream from the dried materials. The air stream is drawn into an optional scrubber 320 by a fan 310. In some embodiments, the optional scrubber 320 is coupled to the apparatus 200 to further remove any odoriferous materials and any off-gasses. The dried materials are transported to one or more presses 270 through an airlock 265. The one or more presses 270 press the dried materials, reducing oil content from the dried materials. The one or more presses 270 include a first opening for delivering pressed oil to a centrifuge 275 and a second opening for transporting the pressed materials to a screener 290 through a hammermill 280. From the screener 290, a portion of the screened material is sent back to the mixer 240. Alternatively, in some embodiments, a portion of the screened material is sent to the grinder 230. The balance of the screened material is sent to storage 300 as finished product or meal.

The dried materials exiting the cyclone 260 (or bag house)—prior to being fed to the presses 270—contain approximately 10 to 40 percent fat and approximately 2 to about 25 percent moisture. The dried materials containing these fat and moisture contents are pressed by the presses 270, resulting in a dried material having approximately 10 percent fat and approximately 10 percent moisture or less. The pressed fat (oil), which is sent to the centrifuge 275, can be used as fuel or as fish oil.

The dryer 250 of the present invention preferably contains a first zone and a second zone. In the first zone, air enters the dryer 250, preferably between 300 to 1,000 degrees Fahrenheit, through an air inlet where it encounters the mixed materials also being fed to the dryer 250. The majority of moisture evaporation occurs in the first zone. As the mixed materials proceed through the second zone, secondary drying takes place to achieve moisture content as low as less than 10 percent.

Figure 3:
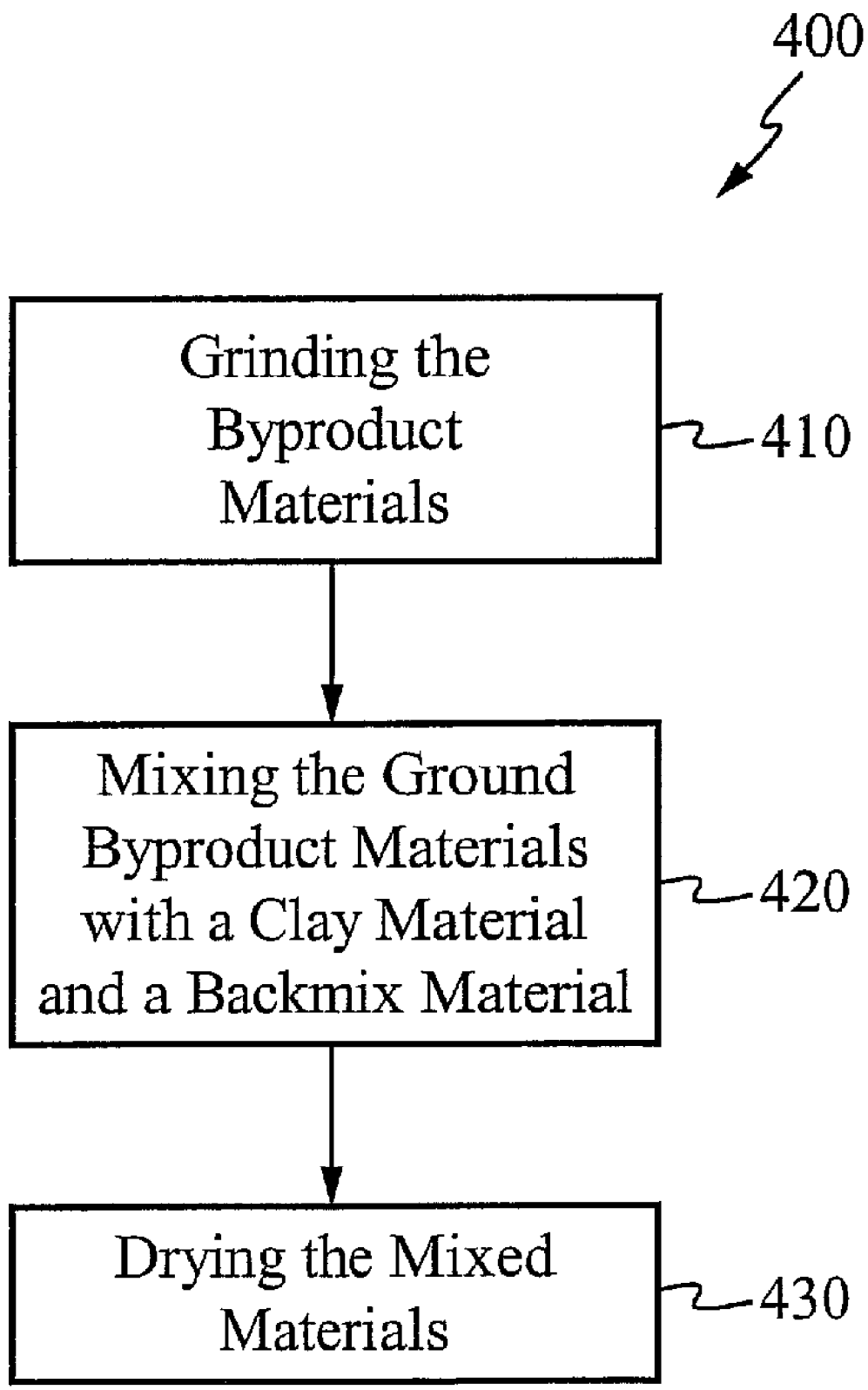
FIG. 3 shows a flow chart of an animal byproduct rendering process, according to another embodiment of the present invention.

FIG. 3 shows a flow chart of an animal byproduct rendering process 400, according to another embodiment of the present invention. In the Step 410, the byproduct materials are ground. In the Step 420, the ground materials are mixed with an oil absorbing material and a backmix material. In the Step 430, the mixed materials are dried. In some embodiments, the process 400 also includes the step of separating an air stream from the dried materials. In some embodiments, the process 400 further includes the steps of transporting the dried materials to one or more presses, thereby reducing oil content from the dried materials, and drawing the air stream to a scrubber. In some embodiments, the process 400 further includes the steps of delivering pressed oil to the centrifuge through a first opening of the screener and transporting the pressed materials to a screener through a second opening of the presses. In some embodiments, the process 400 further includes the steps of feeding the pressed material to the screener from the presses through a hammermill and sending a portion of the screened material back to the mixer and/or the grinder.

The present invention offers any processor the ability to generate revenue via processing their raw material. The present invention offers any processor the ability to dry a raw material that is high in protein and fat content. The present invention grinds and dries an original animal byproduct material containing about 50 to about 80 percent moisture to a finished protein meal containing about 2 to about 25 percent moisture. With this invention, a processor is able to eliminate numerous steps that are typically required to separate the fat from the protein meal. For example, the present invention eliminates the need for waste water treatment, along with condensers, oil (fat) drainers, and cookers, as required in many conventional rendering plants. The present invention requires less capitol cost and man power, and can be integrated into any existing plant, resulting in a finished product of higher quality and an overall process having less environmental concerns, such as odor. The present invention allows any processor to competitively operate a continuous rendering process system on site. The present invention can process 300,000 pounds per week for the same average per pound production cost as another facility that processes 6,000,000 pounds per week. Processing on site eliminates freight expenses of shipping the raw material to an off-site rendering operation.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modification may be made in the embodiments chosen for illustration without departing from the spirit and scope of the invention.

What is claimed is:

1. An apparatus for processing animal byproduct materials, comprising:
 a. a grinder for grinding the byproduct materials;
 b. a mixer for mixing the ground byproduct materials with an oil absorbing material and a backmix material, wherein the backmix material is a portion of a finished product;
 c. a dryer for drying the mixed materials; and
 d. a cyclone for separating an air stream from the dried materials, wherein the air stream is drawn into a scrubber and the dried materials are transported to one or more presses for pressing the dried materials, thereby reducing oil content from the dried materials.

2. The apparatus of claim 1 wherein the one or more presses includes a first opening for delivering pressed oil to a centrifuge and a second opening for transporting the pressed materials to a screener.

3. The apparatus of claim 2 wherein a portion of the screened material is sent back to the mixer and the balance of the screened material are sent to storage as a finished product.

4. The apparatus of claim 2 wherein a portion of the screened material is sent back to the grinder and the balance of the screened material are sent to storage as a finished product.

5. The apparatus of claim 1 wherein the byproduct materials have an original moisture content of about 50 to about 80 percent.

6. The apparatus of claim 5 wherein the ground and mixed materials contain less than 70 percent and greater than about 30 percent moisture prior to drying.

7. The apparatus of claim 6 wherein the dried materials contain about 2 to about 25 percent moisture.

8. The apparatus of claim 1 wherein the backmix material is a dried backmix material.

9. An apparatus for processing animal byproduct materials, comprising:
 a. a grinder for grinding the byproduct materials;
 b. a mixer for mixing the ground byproduct materials with an oil absorbing material and a backmix material, wherein the backmix material is a portion of a finished product;
 c. a dryer for drying the mixed materials; and
 d. a baghouse for separating an air stream from the dried materials, wherein the air stream is drawn into a scrubber and the dried materials are transported to one or more presses for pressing the dried materials, thereby reducing oil content from the dried materials.

10. The apparatus of claim 9 wherein the one or more presses includes a first opening for delivering pressed oil to a centrifuge and a second opening for transporting the pressed materials to a screener.

11. The apparatus of claim 10 wherein a portion of the screened material is sent back to the mixer and the balance of the screened material are sent to storage as a finished product.

12. The apparatus of claim 10 wherein a portion of the screened material is sent back to the grinder and the balance of the screened material are sent to storage as a finished product.

13. The apparatus of claim 9 wherein the byproduct materials have an original moisture content of about 50 to about 80 percent.

14. The apparatus of claim 13 wherein the ground and mixed materials contain less than 70 percent and greater than about 30 percent moisture prior to drying.

15. The apparatus of claim 14 wherein the dried materials contain about 2 to about 25 percent moisture.

16. The apparatus of claim 9 wherein the backmix material is a dried backmix material.

* * * * *